(12) United States Patent
Liu

(10) Patent No.: US 12,055,963 B1
(45) Date of Patent: Aug. 6, 2024

(54) PD CONTROLLER IC

(71) Applicant: VIA LABS, INC., New Taipei (TW)

(72) Inventor: Jung-Chang Liu, New Taipei (TW)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 18/327,834

(22) Filed: Jun. 1, 2023

(30) Foreign Application Priority Data

Mar. 9, 2023 (TW) .................................. 112108716

(51) Int. Cl.
*H02H 9/04* (2006.01)
*G05F 1/56* (2006.01)
*G06F 1/26* (2006.01)
*G06F 1/28* (2006.01)
*H02H 9/02* (2006.01)

(52) U.S. Cl.
CPC ................ *G05F 1/56* (2013.01); *G06F 1/266* (2013.01); *G06F 1/28* (2013.01); *H02H 9/02* (2013.01); *H02H 9/04* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 7,480,126 | B2 * | 1/2009 | Cetrulo | H02H 3/207 |
| | | | | 361/91.1 |
| 10,079,498 | B2 * | 9/2018 | Shimada | H02J 7/00712 |
| 10,148,084 | B2 * | 12/2018 | Forghani-Zadeh | H02H 9/045 |
| 10,320,180 | B1 * | 6/2019 | Venigalla | H01R 13/6683 |
| 10,855,069 | B2 * | 12/2020 | Mukhopadhyay | H02H 3/26 |
| 11,226,664 | B2 * | 1/2022 | Jyani | G06F 1/3215 |
| 11,368,013 | B2 * | 6/2022 | Li | H01L 27/0266 |
| 2015/0305120 | A1 | 10/2015 | Wong et al. | |

FOREIGN PATENT DOCUMENTS

| | | |
|---|---|---|
| CN | 103605308 | 2/2014 |
| CN | 112154578 | 12/2020 |
| TW | 201913268 | 4/2019 |

OTHER PUBLICATIONS

"Office Action of Taiwan Counterpart Application", issued on Oct. 5, 2023, p. 1-p. 8.

* cited by examiner

*Primary Examiner* — Thomas J. Hiltunen
(74) *Attorney, Agent, or Firm* — JCIPRNET

(57) ABSTRACT

A PD controller integrated circuit of a USB apparatus is disclosed, including a CC pad, a first switch, a second switch, a PD controller circuit, a high voltage sensing circuit, and a switch control circuit. The high voltage sensing circuit senses the CC pad. When a current voltage of the CC pad does not exceed a rated range, the first switch and the second switch connected in series between the CC pad and the PD controller circuit are turned on. When the current voltage exceeds the rated range, the first switch and the second switch are turned off, and the switch control circuit maintains a voltage of a common node between the first switch and the second switch at a reduced level lower than the current voltage.

6 Claims, 4 Drawing Sheets

PD CONTROLLER IC

CROSS-REFERENCE TO RELATED APPLICATION

This application claims the priority benefit of Taiwan application serial no. 112108716, filed on Mar. 9, 2023. The entirety of the above-mentioned patent application is hereby incorporated by reference herein and made a part of this specification.

BACKGROUND

Technical Field

The invention relates to an integrated circuit (IC), and more particularly, to a power delivery (PD) controller IC of a universal serial bus (USB) circuit.

Description of Related Art

Generally, a user may use a charger or an adapter to supply power to an electronic product, such as a desk lamp, a speaker, or other electronic products. A connection interface between the charger and the electronic product is generally a connector complied with standard specifications. For example, the connection interface between the charger and the electronic product may include a universal serial bus (USB) type-A connector or a USB type-C connector complied with a USB specification. A host such as a computer may also supply power to the electronic product through the USB connector.

When a USB host (or USB charger, or USB adapter) is connected to the USB connector of the electronic product, a power delivery (PD) controller of the electronic product may exchange configuration information with the USB host through a configuration channel (CC) pin of the USB connector to negotiate a power delivery mode between the USB host and the electronic product. Related operations of the PD controller and the CC pin are regulated to the USB specification, so that details thereof are not repeated here. After determining the power delivery mode, the PD controller may turn on a power switch connected between a power pin (Vbus pin) of the USB connector and a power input terminal of a functional circuit. After the power switch is turned on, the USB host may supply power to the functional circuit of the electronic product through the USB connector and the power switch.

Generally, a voltage of the power pin Vbus of the USB connector is much higher than a voltage of the CC pin. In the USB connector, the CC pin is adjacent to the power pin Vbus. In some unexpected situations, the CC pin and the power pin Vbus may be short-circuited to each other, causing the high voltage of the power pin Vbus to burn the PD controller through the CC pin. How to prevent the unexpected high voltage (high voltage exceeding a rated range) of the CC pin from burning down the PD controller is one of many technical issues in the related field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention relates to a power delivery (PD) controller integrated circuit (IC) to prevent impact of unexpected high voltage (high voltage exceeding a rated range) from a configuration channel (CC) pin of a universal serial bus (USB) connector.

In an embodiment of the invention, the PD controller integrated circuit includes a CC pad, a first switch, a second switch, a PD controller circuit, a high voltage sensing circuit, and a switch control circuit. The CC pad is configured to be coupled to a CC pin of a USB connector. A first terminal of the first switch is coupled to the CC pad. A first terminal of the second switch is coupled to a second terminal of the first switch. The PD controller circuit is coupled to a second terminal of the second switch. The high voltage sensing circuit is coupled to the CC pad. The high voltage sensing circuit senses whether a current voltage of the CC pad exceeds a rated range and correspondingly outputs a sensing result. The switch control circuit is coupled to the high voltage sensing circuit to receive the sensing result. The switch control circuit is coupled to a control terminal of the first switch, the second terminal of the first switch, the first terminal of the second switch, and a control terminal of the second switch. When the sensing result indicates that the current voltage of the CC pad does not exceed the rated range, the switch control circuit turns on the first switch and the second switch, and the PD controller circuit is coupled to the CC pin of the USB connector through the CC pad. When the sensing result indicates that the current voltage of the CC pad exceeds the rated range, the switch control circuit turns off the first switch and the second switch, and the switch control circuit maintains a voltage of the second terminal of the first switch and a voltage of the first terminal of the second switch at a first reduced level. The first reduced level is between a voltage level of the first terminal of the turned-off first switch and a voltage level of the second terminal of the turned-off second switch.

Based on the above, the PD controller IC according to various embodiments of the invention configures the first switch and the second switch between the CC pad and the PD controller circuit. When the voltage of the CC pin of the USB connector connected to the CC pad does not exceed the rated range, the first switch and the second switch are turned on, and the PD controller circuit may exchange configuration information with a USB host through the second switch, the first switch, the CC pad and the CC pin of the USB connector. When the voltage of the CC pin exceeds the rated range, the first switch and the second switch are turned off. Therefore, the first switch and the second switch may prevent the unexpected high voltage (high voltage exceeding the rated range) from the CC pin of the USB connector from impacting/burning the PD controller circuit. In addition, when the first switch and the second switch are turned off, even if the CC pad has an unexpected high voltage, the switch control circuit may ensure that a voltage difference between the voltage of the first terminal of the first switch and the voltage of the second terminal of the first switch is less than the unexpected high voltage, and ensure that a voltage difference between the voltage of the first terminal of the second switch and the voltage of the second terminal of the second switch is less than the unexpected high voltage. Therefore, the first switch and the second switch (PD controller IC) may be implemented by using a general manufacturing process with a lower withstand voltage instead of an expensive high voltage manufacturing process.

In order for the aforementioned features and advantages of the invention to be more comprehensible, several embodiments accompanied with drawings are described in detail as follows.

DESCRIPTION OF THE EMBODIMENTS

Figure 1:
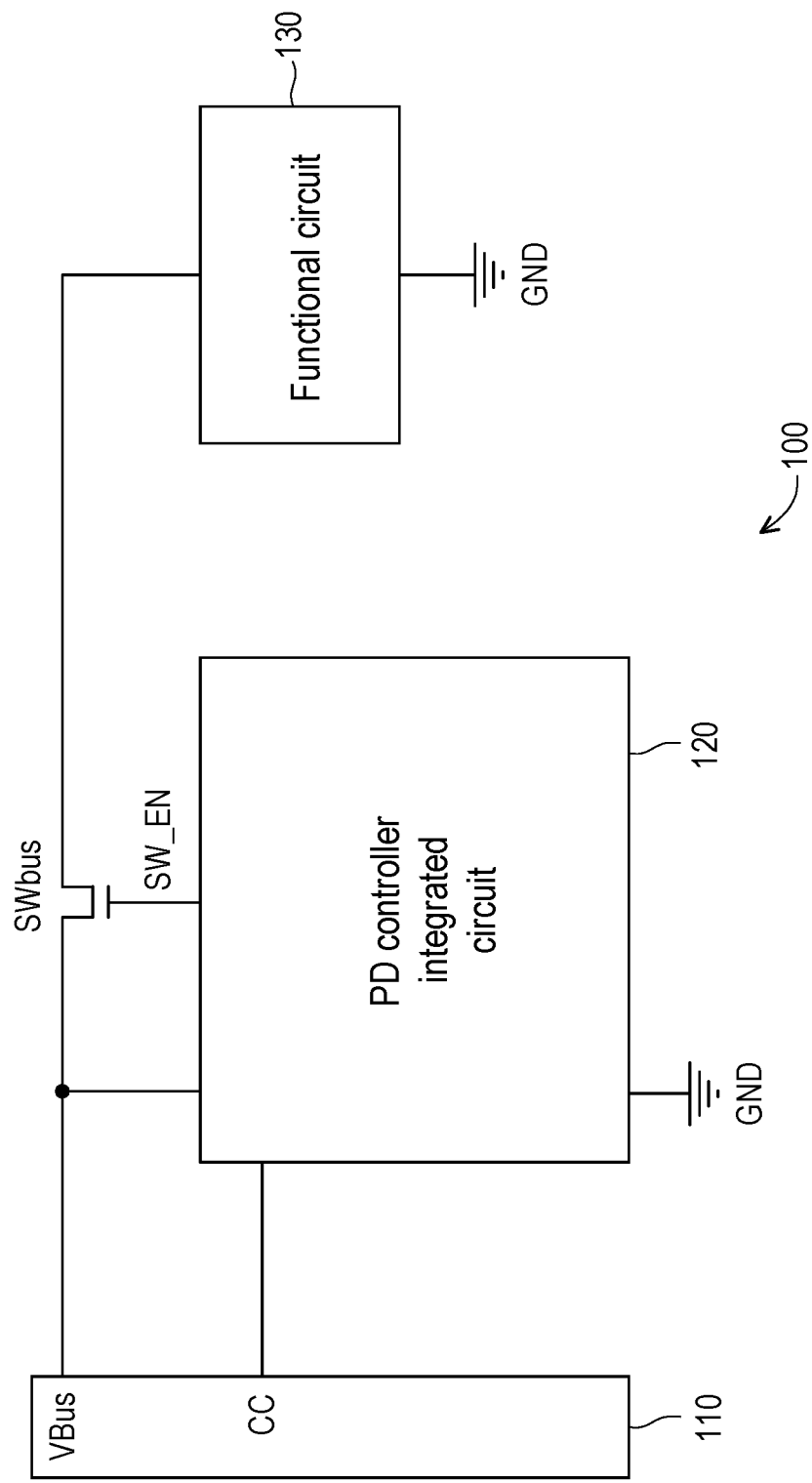
FIG. 1 is a schematic circuit block diagram of an electronic product according to an embodiment of the invention.

A term "couple (or connect)" used in the full text of the disclosure (including the claims) refers to any direct and indirect connections. For example, if a first device is described to be coupled (or connected) to a second device, it is interpreted as that the first device is directly coupled to the second device, or the first device is indirectly coupled to the second device through other devices or connection means. "First", "second", etc., mentioned in the specification and the claims are merely used to name the elements or distinguish different embodiments or ranges and should not be regarded as limiting the upper or lower bound of the number of the components/devices. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic circuit block diagram of an electronic product 100 according to an embodiment of the invention. The electronic product 100 shown in FIG. 1 includes a universal serial bus (USB) connector 110, a power delivery (PD) controller integrated circuit 120, a functional circuit 130 and a power switch SWbus. As an example, the USB connector 110 may include a USB type-C connector. A first terminal of the power switch SWbus is coupled to a power pin Vbus of the USB connector 110. A second terminal of the power switch SWbus is coupled to a power input terminal of the functional circuit 130. A control terminal of the power switch SWbus is coupled to the PD controller IC 120 to receive a power switch control voltage SW_EN. The PD controller IC 120 may generate the power switch control voltage SW_EN to control the power switch SWbus.

The PD controller IC 120 is further coupled to a configuration channel (CC) pin of the USB connector 110. When a USB host (or USB charger, or USB adapter, not shown in FIG. 1) is connected to the USB connector 110 of the electronic product 100, the PD controller IC 120 may exchange configuration information with the USB host through the CC pin of the USB connector 110 to negotiate a power delivery mode between the USB host and the electronic product 100. The related operation of the CC pin is regulated to a USB specification, so that detail thereof is not repeated here. After determining the power delivery mode, the PD controller IC 120 may turn on the power switch SWbus, and the USB host may provide a negotiated power to the functional circuit 130 through the power pin Vbus and the power switch SWbus.

Generally, a voltage of the power pin Vbus is much larger than a rated range of a voltage of the CC pin. In the USB connector 110, the CC pin is adjacent to the power pin Vbus. In some unexpected situations, the CC pin and the power pin Vbus may be short-circuited to each other, and the high voltage of the power pin Vbus may impact an internal circuit of the PD controller IC 120 through the CC pin. The following embodiments will illustrate how the PD controller IC 120 prevents the unexpected high voltage (high voltage exceeding the rated range) of the CC pin of the USB connector 110 from burning down the internal circuit.

Figure 2:
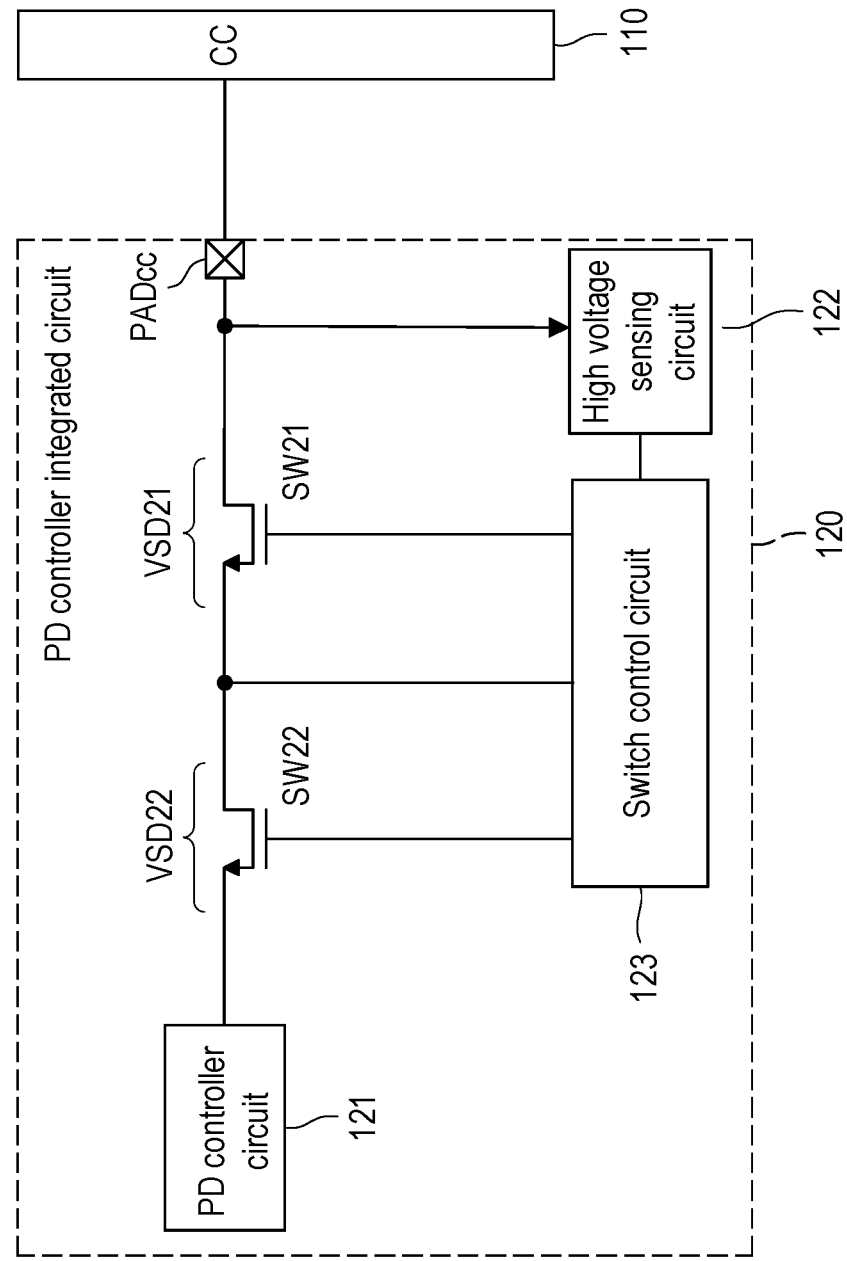
FIG. 2 is a schematic circuit block diagram of a PD controller integrated circuit according to an embodiment of the invention.

FIG. 2 is a schematic circuit block diagram of the PD controller IC 120 according to an embodiment of the invention. The PD controller IC 120 shown in FIG. 2 may be used as one of many implementation examples of the PD controller IC 120 shown in FIG. 1. In the embodiment shown in FIG. 2, the PD controller IC 120 includes a CC pad PADcc, a switch SW21, a switch SW22, a PD controller circuit 121, a high voltage sensing circuit 122 and a switch control circuit 123. According to different designs, in some embodiments, the PD controller circuit 121 may be implemented by a hardware circuit. In some other embodiments, the PD controller circuit 121 may be implemented by firmware, software (i.e., program), or a combination thereof. In some other embodiments, the PD controller circuit 121 may be implemented by a combination of hardware, firmware, and software.

In terms of hardware, the PD controller circuit 121 may be implemented as logic circuits on an integrated circuit. For example, the related functions of the PD controller circuit 121 may be implemented in one or more controllers, microcontrollers, microprocessors, application-specific integrated circuits (ASICs), digital signal processors (DSPs), field programmable logic gate arrays (FPGAs) and/or various logic blocks, modules and circuits in other processing units. The related functions of the PD controller circuit 121 may be implemented as hardware circuits by using hardware description languages (such as Verilog HDL or VHDL) or other suitable programming languages, such as various logic blocks, modules and circuits in integrated circuit.

In the form of software and/or firmware, the related functions of the PD controller circuit 121 may be implemented as programming codes. For example, the PD controller circuit 121 is implemented by using common programming languages (such as C. C++ or assembly language) or other suitable programming languages. The programming codes may be recorded/stored in a "non-transitory computer readable medium". In some embodiments, the non-transitory computer-readable medium includes, for example, a semiconductor memory and/or a storage device. The semiconductor memory includes a memory card, a read only memory (ROM), a flash memory, a programmable logic circuit or other semiconductor memories. The storage device includes a tape, a disk, a hard disk drive (HDD), a solid-state drive (SSD) or other storage devices. An electronic device (such as a central processing unit (CPU), a controller, a microcontroller or a microprocessor) may read and execute the programming codes from/in the non-transitory computer readable medium, thereby implementing the related functions of the PD controller circuit 121.

The CC pad PADcc is configured to be coupled to the CC pin of the USB connector 110. A first terminal of the switch SW21 is coupled to the CC pad PADcc. A first terminal of the switch SW22 is coupled to a second terminal of the switch SW21. The PD controller circuit 121 is coupled to a second terminal of the switch SW22. The high voltage sensing circuit 122 is coupled to the CC pad PADcc. The high voltage sensing circuit 122 may sense whether a current voltage of the CC pad PADcc exceeds the rated range of the CC pin, and correspondingly output a sensing result to the switch control circuit 123. The rated range of the CC pin is regulated to the USB specification, so that detail thereof is not repeated here. The switch control circuit 123 is coupled to the high voltage sensing circuit 122 to receive the sensing result. The switch control circuit 123 is further coupled to a control terminal of the switch SW21, the second terminal of the switch SW21, the first terminal of the switch SW22 and a control terminal of the switch SW22, as shown in FIG. 2.

When the sensing result of the high voltage sensing circuit 122 indicates that "the current voltage of the CC pad PADcc does not exceed the rated range", the switch control circuit 123 turns on the switch SW21 and the switch SW22, and the PD controller circuit 121 may be coupled to the CC pin of the USB connector 110 through the CC pad PADcc. Therefore, in the case that the voltage of the CC pin of the USB connector 110 does not exceed the rated range, the PD controller circuit 121 may exchange the configuration information with the USB host (not shown in FIG. 2) through the switch SW22, the switch SW21, the CC pad PADcc and the CC pin of the USB connector 110 to negotiate the power delivery mode between the USB host and the electronic product 100.

When the sensing result of the high voltage sensing circuit 122 indicates that "the current voltage of the CC pad PADcc exceeds the rated range", the switch control circuit 123 may immediately turn off the switch SW21 and the switch SW22. Therefore, the switch SW21 and the switch SW22 may prevent the unexpected high voltage (high voltage exceeding the rated range) from the CC pin of the USB connector 110 from impacting/burning the PD controller circuit 121.

In addition, when the switch SW21 and the switch SW22 are turned off, even if the CC pad PADcc has an unexpected high voltage, the switch control circuit 123 may maintain the voltage of the second terminal of the switch SW21 and the voltage of the first terminal of the switch SW22 at a reduced level. Where, the reduced level is between the voltage level of the first terminal of the turned-off switch SW21 and the voltage level of the second terminal of the turned-off switch SW22. The switch control circuit 123 may ensure that a voltage difference VSD21 between the voltage at the first terminal of the switch SW21 and the voltage at the second terminal of the switch SW21 is smaller than the unexpected high voltage, and ensure that a voltage difference VSD22 between the voltage at the first terminal of the switch SW22 and the voltage at the second terminal of the switch SW22 is smaller than the unexpected high voltage. Therefore, the switch SW21 and the switch SW22 (the PD controller IC 120) may be implemented by using a general manufacturing process with a lower withstand voltage instead of an expensive high voltage manufacturing process. In the case that the current voltage of the CC pad PADcc exceeds the rated range, the maximum withstand voltage of each of the switch SW21 and the switch SW22 may be smaller than the current voltage of the CC pad PADcc.

Figure 3:
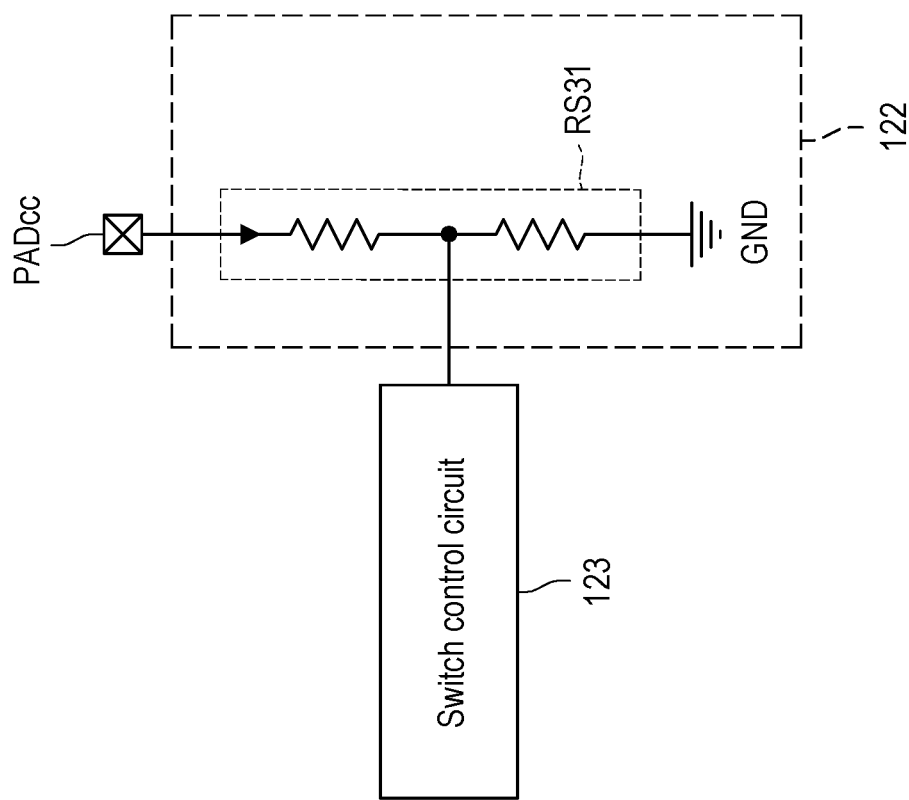
FIG. 3 is a schematic circuit block diagram of a high voltage sensing circuit according to an embodiment of the invention.

FIG. 3 is a schematic circuit block diagram of the high voltage sensing circuit 122 according to an embodiment of the invention. The high voltage sensing circuit 122 shown in FIG. 3 may be used as one of many implementation examples of the high voltage sensing circuit 122 shown in FIG. 2. In the embodiment shown in FIG. 3, the high voltage sensing circuit 122 includes a voltage dividing resistor string RS31. A first terminal of the voltage dividing resistor string RS31 is coupled to the CC pad PADcc. A second terminal of the voltage dividing resistor string RS31 is coupled to a reference voltage (such as a ground voltage GND or other fixed voltages). The voltage dividing resistor string RS31 may generate a divided voltage to serve as the sensing result to the switch control circuit 123. Therefore, the switch control circuit 123 may determine whether the current voltage of the CC pad PADcc exceeds the rated range of the CC pin according to the divided voltage of the voltage dividing resistor string RS31. Regarding the CC pad PADcc, the high voltage sensing circuit 122 and the switch control circuit 123 shown in FIG. 3, reference may be made to the related descriptions of the CC pad PADcc, the high voltage sensing circuit 122 and the switch control circuit 123 shown in FIG. 2, and details thereof are not repeated here.

Figure 4:
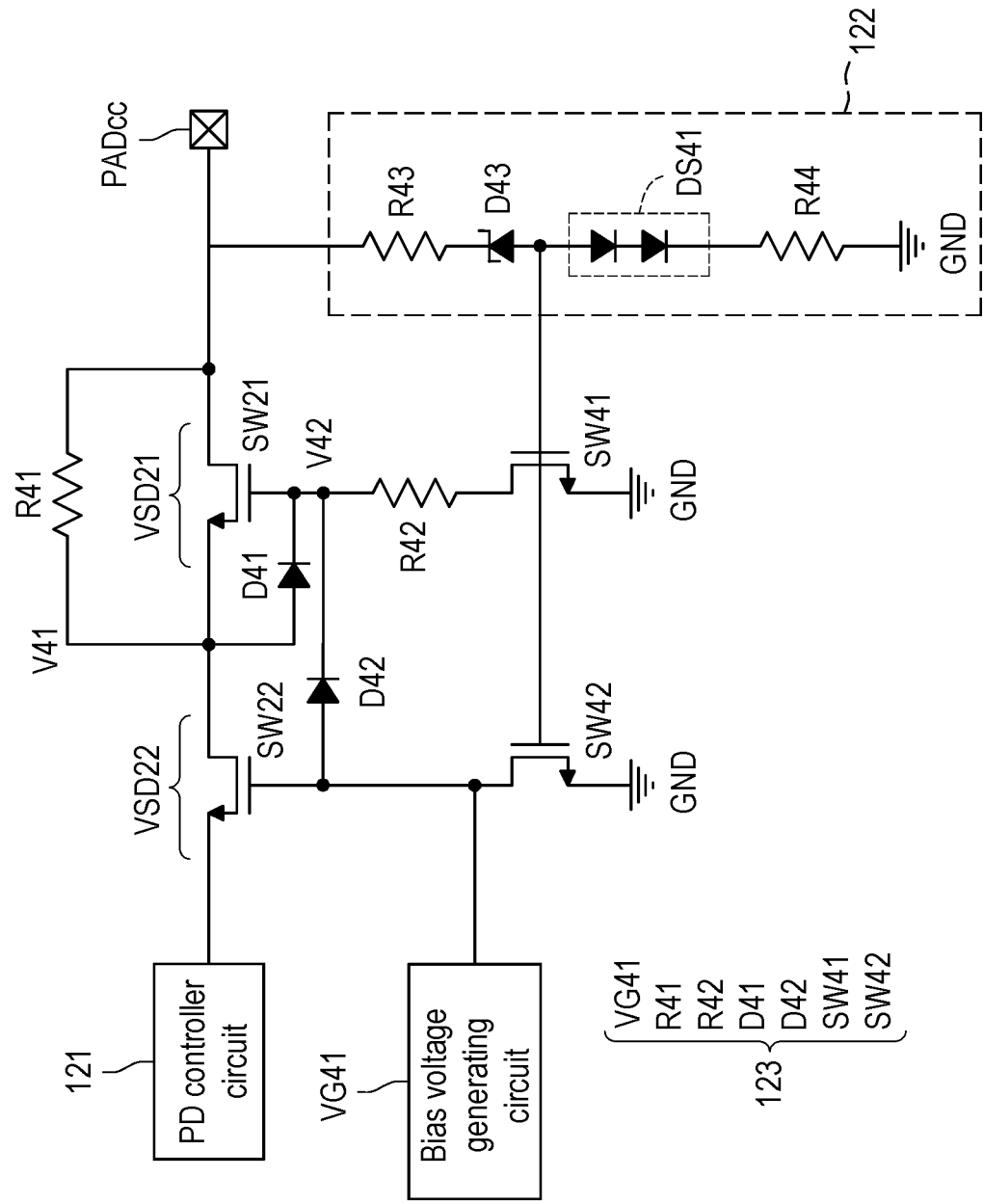
FIG. 4 is a schematic circuit block diagram of a high voltage sensing circuit and a switch control circuit according to an embodiment of the invention.

FIG. 4 is a schematic circuit block diagram of the high voltage sensing circuit 122 and the switch control circuit 123 according to an embodiment of the invention. The high voltage sensing circuit 122 and the switch control circuit 123 shown in FIG. 4 may be used as one of many implementation examples of the high voltage sensing circuit 122 and the switch control circuit 123 shown in FIG. 2. In the embodiment shown in FIG. 4, the high voltage sensing circuit 122 includes a resistor R43, a Zener diode D43, a diode string DS41 and a resistor R44. A first terminal of the resistor R43 is coupled to the CC pad PADcc. A cathode of the Zener diode D43 is coupled to a second terminal of the resistor R43. An anode of the Zener diode D43 is coupled to the switch control circuit 123 to provide the sensing result. An anode of the diode string DS41 is coupled to the anode of the Zener diode D43. A first terminal of the resistor R44 is coupled to a cathode of the diode string DS41. A second terminal of the resistor R44 is coupled to a reference voltage (such as the ground voltage GND or other fixed voltages).

When the current voltage of the CC pad PADcc does not exceed the rated range, the Zener diode D43 is turned off, and the resistor R44 pulls down an anode voltage (for example, the sensing result of the high voltage sensing circuit 122) of the Zener diode D43 through the diode string DS41. When the current voltage of the CC pad PADcc exceeds the rated range, the Zener diode D43 is turned on due to breakdown. At this time, the resistor R43, the Zener diode D43, the diode string DS41 and the resistor R44 may divide the current voltage of the CC pad PADcc to generate a high level voltage (the sensing result of the high voltage sensing circuit 122) to the switch control circuit 123.

In the embodiment shown in FIG. 4, the switch control circuit 123 includes a resistor R41, a resistor R42, a diode D41, a diode D42, a switch SW41, a switch SW42 and a bias voltage generating circuit VG41. A first terminal of the resistor R41 is coupled to the CC pad PADcc. A second terminal of the resistor R41 is coupled to the second terminal of the switch SW21 and the first terminal of the switch SW22. An anode of the diode D41 is coupled to the second terminal of the switch SW21 and the first terminal of the switch SW22. A cathode of the diode D41 is coupled to the control terminal of the switch SW21. A first terminal of the resistor R42 is coupled to the cathode of the diode D41 and the control terminal of the switch SW21. A first terminal of the switch SW41 is coupled to a second terminal of the resistor R42. A second terminal of the switch SW41 is coupled to the reference voltage (such as the ground voltage GND or other fixed voltages). A control terminal of the switch SW41 is coupled to the high voltage sensing circuit 122 to receive the sensing result (for example, the anode voltage of the Zener diode D43).

An anode of the diode D42 is coupled to the control terminal of the switch SW21. A cathode of the diode D42 is coupled to the control terminal of the switch SW21 and the first terminal of the resistor R42. A first terminal of the switch SW42 is coupled to the control terminal of the switch SW22. A second terminal of the switch SW42 is coupled to the reference voltage (such as the ground voltage GND or other fixed voltages). A control terminal of the switch SW42 is coupled to the high voltage sensing circuit 122 to receive the sensing result (for example, the anode voltage of the Zener diode D43). The bias voltage generating circuit VG41 is coupled to the control terminal of the switch SW22 and the anode of the diode D42 to provide a bias voltage. Based on an actual design, in some embodiments, the bias voltage generating circuit VG41 may include a charge pump circuit and/or other voltage generating circuits.

When the sensing result of the high voltage sensing circuit 122 (such as the anode voltage of the Zener diode D43) indicates that "the current voltage of the CC pad PADcc does not exceed the rated range", the high voltage sensing circuit 122 may turn off the switch SW41 and the switch SW42. The bias voltage provided by the bias voltage generating circuit VG41 may be transmitted to the control terminal of the switch SW22, and the switch SW22 is turned on. The bias voltage provided by the bias voltage generating circuit VG41 may also be transmitted to the control terminal of the switch SW21 through the diode D42, and the switch SW21 is turned on.

When the sensing result of the high voltage sensing circuit 122 (such as the anode voltage of the Zener diode D43) indicates that "the current voltage of the CC pad PADcc exceeds the rated range", the high voltage sensing circuit 122 may turn on the switch SW41 and the switch SW42, and the bias voltage generating circuit VG41 stops providing the bias voltage. At this time, the reference voltage (such as the ground voltage GND or other fixed voltages) passes through the switch SW42, so that the switch SW22 is turned off. The resistor R41, the diode D41 and the resistor R42 divide the current voltage of the CC pad PADcc to generate a reduced level V42 to the control terminal of the switch SW21 to turn off the switch SW21. The resistor R41, the diode D41 and the resistor R42 divide the current voltage of the CC pad PADcc to maintain the voltage of the second terminal of the switch SW21 and the voltage of the first terminal of the switch SW22 at a reduced level V41.

In summary, the PD controller IC 120 according to various embodiments of the invention configures the switch SW21 and the switch SW22 between the CC pad PADcc and the PD controller circuit 121. When the voltage of the CC pin of the USB connector 110 connected to the CC pad PADcc does not exceed the rated range, the switch SW21 and the switch SW22 are turned on, and the PD controller circuit 121 may exchange configuration information with the USB host (not shown) through the switch SW22, the switch SW21, the CC pad PADcc and the CC pin of the USB connector 110. When the voltage of the CC pin exceeds the rated range, the switch SW21 and the switch SW22 are turned off. Therefore, the switch SW21 and the switch SW22 may prevent the unexpected high voltage (high voltage exceeding the rated range) from the CC pin of the USB connector 110 from impacting/burning the PD controller circuit 121. In addition, when the switch SW21 and the switch SW22 are turned off, even if the CC pad has an unexpected high voltage, the switch control circuit 123 may ensure that a voltage difference VSD21 between the voltage of the first terminal of the switch SW21 and the voltage of the second terminal is less than the unexpected high voltage, and ensure that a voltage difference VSD22 between the voltage of the first terminal of the switch SW22 and the voltage of the second terminal is less than the unexpected high voltage. Therefore, the switch SW21 and the switch SW22 (the PD controller IC 120) may be implemented by using a general manufacturing process with a lower withstand voltage instead of an expensive high voltage manufacturing process.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A power delivery controller integrated circuit, comprising:
    a configuration channel pad configured to be coupled to a configuration channel pin of a universal serial bus connector;
    a first switch having a first terminal coupled to the configuration channel pad;
    a second switch having a first terminal coupled to a second terminal of the first switch;
    a power delivery controller circuit coupled to a second terminal of the second switch;
    a high voltage sensing circuit coupled to the configuration channel pad, configured to sense whether a current voltage of the configuration channel pad exceeds a rated range, and correspondingly outputting a sensing result; and
    a switch control circuit coupled to the high voltage sensing circuit to receive the sensing result, and coupled to a control terminal of the first switch, the second terminal of the first switch, the first terminal of the second switch, and a control terminal of the second switch, wherein
    when the sensing result indicates that the current voltage of the configuration channel pad does not exceed the rated range, the switch control circuit turns on the first switch and the second switch, so that the power delivery controller circuit is coupled to the configuration channel pin of the universal serial bus connector through the configuration channel pad; and
    when the sensing result indicates that the current voltage of the configuration channel pad exceeds the rated range, the switch control circuit turns off the first switch and the second switch, the switch control circuit maintains a voltage of the second terminal of the first switch and a voltage of the first terminal of the second switch at a first reduced level, and the first reduced level is between a voltage level of the first terminal of the turned-off first switch and a voltage level of the second terminal of the turned-off second switch.

2. The power delivery controller integrated circuit according to claim 1, wherein when the current voltage of the configuration channel pad exceeds the rated range, a maximum withstand voltage of each of the first switch and the second switch is lower than the current voltage of the configuration channel pad.

3. The power delivery controller integrated circuit according to claim 1, wherein the high voltage sensing circuit comprises:

a voltage dividing resistor string having a first terminal coupled to the configuration channel pad, wherein a second terminal of the voltage dividing resistor string is coupled to a reference voltage, and the voltage dividing resistor string generates a divided voltage as the sensing result.

4. The power delivery controller integrated circuit according to claim 1, wherein the high voltage sensing circuit comprises:
   a first resistor having a first terminal coupled to the configuration channel pad;
   a Zener diode having a cathode coupled to a second terminal of the first resistor, wherein an anode of the Zener diode is coupled to the switch control circuit to provide the sensing result;
   a diode string having an anode coupled to the anode of the Zener diode; and
   a second resistor having a first terminal coupled to a cathode of the diode string, wherein a second terminal of the second resistor is coupled to a reference voltage.

5. The power delivery controller integrated circuit according to claim 1, wherein the switch control circuit comprises:
   a first resistor having a first terminal coupled to the configuration channel pad, wherein a second terminal of the first resistor is coupled to the second terminal of the first switch and the first terminal of the second switch;
   a first diode having an anode coupled to the second terminal of the first switch and the first terminal of the second switch, wherein a cathode of the first diode is coupled to the control terminal of the first switch;
   a second resistor having a first terminal coupled to the cathode of the first diode and the control terminal of the first switch;
   a third switch having a first terminal coupled to a second terminal of the second resistor, wherein a second terminal of the third switch is coupled to a first reference voltage, and a control terminal of the third switch is coupled to the high voltage sensing circuit to receive the sensing result;
   a second diode having an anode coupled to the control terminal of the second switch, wherein a cathode of the second diode is coupled to the control terminal of the first switch and the first terminal of the second resistor;
   a bias voltage generating circuit coupled to the control terminal of the second switch and the anode of the second diode to provide a bias voltage; and
   a fourth switch having a first terminal coupled to the control terminal of the second switch, wherein a second terminal of the fourth switch is coupled to a second reference voltage, and a control terminal of the fourth switch is coupled to the high voltage sensing circuit to receive the sensing result.

6. The power delivery controller integrated circuit according to claim 5, wherein
   when the sensing result indicates that the current voltage of the configuration channel pad does not exceed the rated range, the high voltage sensing circuit turns off the third switch and the fourth switch, and the bias voltage provided by the bias voltage generating circuit turns on the first switch and the second switch; and
   when the sensing result indicates that the current voltage of the configuration channel pad exceeds the rated range, the high voltage sensing circuit turns on the third switch and the fourth switch, the second reference voltage turns off the second switch, the first resistor, the first diode, and the second resistor divide the current voltage to generate a second reduced level to the control terminal of the first switch to turn off the first switch, and the first resistor, the first diode and the second resistor divide the current voltage to maintain the voltage of the second terminal of the first switch and the voltage of the first terminal of the second switch at the first reduced level.

\* \* \* \* \*